US 8,218,210 B2

(12) United States Patent
Gitter

(10) Patent No.: US 8,218,210 B2
(45) Date of Patent: Jul. 10, 2012

(54) METHOD FOR GENERATING COMPUTER-GENERATED VIDEO HOLOGRAMS IN REAL TIME BY MEANS OF PROPAGATION

(75) Inventor: Kurt Gitter, Dresden (DE)

(73) Assignee: SeeReal Technologies S.A., Munsbach (LU)

( * ) Notice: Subject to any disclaimer, the term of this patent is extended or adjusted under 35 U.S.C. 154(b) by 588 days.

(21) Appl. No.: 12/439,214

(22) PCT Filed: Aug. 31, 2007

(86) PCT No.: PCT/EP2007/059125
§ 371 (c)(1),
(2), (4) Date: Sep. 30, 2009

(87) PCT Pub. No.: WO2008/025844
PCT Pub. Date: Mar. 6, 2008

(65) Prior Publication Data
US 2010/0033780 A1    Feb. 11, 2010

(30) Foreign Application Priority Data

Sep. 1, 2006  (DE) .......................... 10 2006 042 323
Sep. 1, 2006  (DE) .......................... 10 2006 042 324
Sep. 1, 2006  (DE) .......................... 10 2006 042 326
Sep. 1, 2006  (DE) .......................... 10 2006 042 613

(51) Int. Cl.
*G03H 1/08* (2006.01)
(52) U.S. Cl. ............................................. 359/9; 348/40
(58) Field of Classification Search ........ 359/9; 348/40, 348/41
See application file for complete search history.

(56) References Cited

U.S. PATENT DOCUMENTS
7,782,510 B2 *   8/2010   Wilson et al. .................... 359/9

FOREIGN PATENT DOCUMENTS
| DE | 10 2006 004 300 | 8/2007 |
| WO | WO 02/39192 | 5/2002 |
| WO | WO 2004/044659 | 5/2004 |
| WO | WO 2006/027228 | 3/2006 |
| WO | WO 2006/066906 | 6/2006 |
| WO | WO 2006/066919 | 6/2006 |
| WO | WO 2006/119760 | 11/2006 |

OTHER PUBLICATIONS

International Search Report, dated Feb. 8, 2008, issued in priority International Application No. PCT/EP2007/059125.
Lucente, M., "Computational holographic bandwidth compression," IBM Systems Journal, IBM Corp, vol. 35, No. 3/4, pp. 349-365 (1996) XP000635081.
Takahashi Hideya et al., "Direct volume access by an improved electro-holography image generator," Proceedings of the SPIE, vol. 2406, pp. 220-225 (1995) XP007903699.

* cited by examiner

*Primary Examiner* — Alessandro Amari
(74) *Attorney, Agent, or Firm* — Saul Ewing LLP

(57) ABSTRACT

The invention relates to a method for generating video holograms in real time for a holographic reproduction device using at least one light modulator means in which a scene split into object points is encoded as a whole hologram in the form of the reconstruction of a visibility region in a periodicity interval of the reconstruction of the video hologram. The reconstruction of an individual object point only requires part of the whole hologram encoded on the light modulator means. The invention is characterized in that, for each object point, the contributions for propagation of the light waves in the visibility region can be determined from at least one look-up table.

15 Claims, 3 Drawing Sheets

METHOD FOR GENERATING COMPUTER-GENERATED VIDEO HOLOGRAMS IN REAL TIME BY MEANS OF PROPAGATION

CROSS REFERENCE TO RELATED APPLICATIONS

This application claims the priority of PCT/EP2007/059125, filed on Aug. 31, 2007, which claims priority to DE 10 2006 042323.2, filed Sep. 1, 2006, DE 10 2006 042324.0, filed Sep. 1, 2006, DE 10 2006 042326.7, filed Sep. 1, 2006, and DE 10 2006 042613.4, filed Sep. 1, 2006, the entire contents of which are hereby incorporated in total by reference.

BACKGROUND OF THE INVENTION

The invention relates to a method for generating video holograms, in particular computer-generated video holograms (CGVH), from image data with depth information in real time. During the holographic reconstruction of the three-dimensional objects or three-dimensional scenes, the light wave front is generated through interference and superimposition of coherent light waves.

FIELD OF THE INVENTION

In contrast to classic holograms, which are stored photographically or in another suitable way in the form of interference patterns, video holograms exist as the result of a computation of hologram data from sequences of a three-dimensional scene and are stored in electronic means.

Modulated light which is capable of generating interference propagates in the space in front of the eyes of an observer in the form of a light wave front which is controllable as regards amplitude and phase values, said light wave front thereby reconstructing a three-dimensional scene. Controlling a light modulator means with the hologram values of the video holograms causes the emitted wave field, which has been modulated in pixels, to reconstruct the desired three-dimensional scene in the space by creating interferences.

A holographic display device typically comprises an arrangement of controllable pixels which reconstruct object points by electronically influencing the amplitude and/or phase of illuminating light. Many types of light modulator means are known. Such an arrangement can for example be a spatial light modulator (SLM). The display device may alternatively be of a continuous type instead of a matrix type. For example, it may be a continuous light modulator, including a continuous SLM with matrix control or an acousto-optic modulator (AOM). A liquid crystal display LCD serves as an example of such a suitable display device for the reconstruction of video holograms by way of spatial amplitude modulation of a light pattern. However, this invention can also be applied to other controllable devices which use coherent light for modulating a light wave front.

In this document, the term 'pixel' denotes a controllable hologram pixel in the light modulator means; a pixel is individually addressed and is controlled by a discrete value of a hologram point. Each pixel represents a hologram point of the video hologram. In an LCD, the term 'pixel' is therefore used for the individually addressable image points of the display screen. In a Digital Light Processing display (DLP), the term 'pixel' is used for an individual micro-mirror or a small group of micro-mirrors. In a continuous SLM, a 'pixel' is the transitional region on the light modulator means which represents a complex hologram point. The term 'pixel' thus generally denotes the smallest unit which represents or which is able to display a complex hologram point.

A holographic display device which is preferably used for the present invention is substantially based on the following principle: a scene which is divided into object points is encoded as a total hologram on at least one light modulator means. The scene can be seen as a reconstruction from a visibility region which lies within one periodicity interval of the reconstruction of the video hologram. A sub-hologram is defined for each object point of the scene to be reconstructed. The total hologram is formed by a superimposition of sub-holograms. In general, the principle is to reconstruct mainly that wave front that would be emitted by an object into one or multiple visibility regions.

In detail, such a device is based on the principle that the reconstruction of an individual object point only requires a sub-hologram as a subset of the total hologram encoded on the light modulator means.

The holographic display device comprises at least one screen means. The screen means is either the light modulator itself where the hologram of a scene is encoded or an optical element—such as a lens or a mirror—on to which a hologram or wave front of a scene encoded on the light modulator is projected.

The definition of the screen means and the corresponding principles for the reconstruction of the scene in the visibility region are described in other documents filed by the applicant. In documents WO 2004/044659 and WO 2006/027228, the screen means is the light modulator itself. In document WO 2006/119760, "Projection device and method for holographic reconstruction of scenes", the screen means is an optical element on to which a hologram which is encoded on the light modulator is projected. In document DE 10 2006 004 300, "Projection device for the holographic reconstruction of scenes", the screen means is an optical element on to which a wave front of the scene encoded on the light modulator is projected.

A 'visibility region' is a confined region through which the observer can watch the entire reconstructed scene. Within the visibility region, the wave fields interfere to form a wave front such that the reconstructed scene becomes visible for the observer. The visibility region is located on or near the eyes of the observer. The visibility region can be moved in the directions X, Y and Z and is tracked to the actual observer position with the help of known position detection and tracking systems. It is possible to use two visibility regions for each observer, one for each eye. Generally, other embodiments of visibility regions are also possible. It is further possible to encode video holograms such that individual objects or the entire scene seemingly lie behind the light modulator for the observer.

A virtual, frustum-shaped reconstruction space stretches between the light modulator means of the holographic display device and the visibility region, where the light modulator represents the base and the visibility region represents the top of the frustum. If the visibility regions are very small, the frustum can be approximated as a pyramid. The observer looks through the visibility region towards the holographic display device and receives in the visibility region the wave front which represents the scene.

Document WO/2006/066906 filed by the applicant describes a method for computing video holograms. It generally includes the steps of slicing the scene into section planes which are parallel to the plane of a light modulator, transforming all those section planes into a visibility region and adding them up in the visibility region. Then, the added results are back-transformed into the hologram plane, where also the light modulator is disposed, thus determining the complex hologram values of the video hologram.

This method substantially carries out the following steps aided by a computer for a three-dimensional scene:

A diffraction image is computed in the form of a separate two-dimensional distribution of wave fields for an observer plane, which is situated at a finite distance and parallel to the section planes, from each object data set of each tomographic scene section, where the wave fields of all sections are computed for at least one common visibility region;

The computed distributions of all section layers are added to define an aggregated wave field for the visibility region in a data set which is referenced in relation to the observer plane;

For generating a hologram data set for a common computer-generated hologram of the scene, the reference data set is transformed into a hologram plane, which is situated at a finite distance and parallel to the reference plane, where the light modulator means lies in the hologram plane.

Due to the large number of necessary transformations, the implementation of this method causes great computational loads. It can be seen that real-time encoding or generation of the hologram values would require costly high-performance computing units. Such expensive computing units would limit or impair the acceptance of digital video holography.

SUMMARY OF THE INVENTION

It is thus the object of the present invention to provide a method for generating video holograms from three-dimensional image data with depth information in real time. It shall be possible to generate these holograms using simple and inexpensive computing units.

The object is solved by a method where for all object points the contributions to the propagation of the light waves into the visibility region can be retrieved from at least one look-up table. These contributions are described for each object point by a data set $DP_{VR}$ of the propagation, said data set being referenced to the visibility region.

The method according to this invention is suitable for holographic display devices as defined in the preamble of claim 1. Such a holographic display device with adequate light modulator means is therein based on the principle to superimpose the wave fields which are modulated with the information of object points of a scene in at least one visibility region.

A particularly preferred embodiment of the method is described below: in a preparatory process step, the visible object points of a scene which is represented by image data with depth information are determined. Prepared data are preferably already taken over from an interface or from a graphics card. The method according to this invention comprises the following process steps for each visible object point of the scene:

Step (1): Propagation of the light waves of the object point by transformation into the visibility region in order to obtain a data set $DP_{VR}$ of the propagation, said data set being referenced to the visibility region.

Step (2): Repetition of the transformation until the entire scene is transformed with all its object points, and addition of the results of the individual transformations $DP_{VR}$ so as to describe an aggregated wave field of the entire scene for the visibility region in a data set $D\Sigma_{VR}$, which is referenced to the visibility region.

$$D\Sigma_{VR} = \Sigma DP_{VRi}$$

The referenced data set $D\Sigma_{VR}$ thus represents or describes the entire scene which is transformed into the visibility region.

Step (3): Back-transformation, where the aggregated data set $D\Sigma_{VR}$, which was found in step 2 and which is referenced to the visibility region, is transformed from the visibility region into a hologram plane in which the light modulator means lies, so as to generate complex hologram values for the video hologram.

The invention is based on an idea that for each object point the data set $DP_{VR}$ which is referenced to the propagation of the light waves into the visibility region can be retrieved from at least one look-up table.

The look-up table comprises these referenced data sets $DP_{VR}$. The look-up table is structured such as to allow fast access to the data. A look-up table can be implemented in any kind of data carriers, memory sections and interfaces which provide the above-mentioned data sets. Examples are dedicated memory sections, data carriers, databases or other storage media and interfaces. Preferred interfaces are the internet, WLAN, Ethernet and other local and global networks.

According to a further aspect of the invention, additional corrective functions are applied, e.g. in order to compensate tolerances of the light modulator means which are caused by its position or shape, or to improve the reconstruction quality. Corrective values are for example modulated to the data sets $DP_{VR}$, which are referenced to the propagation of the light waves into the visibility region, and/or to the aggregated data set $D\Sigma_{VR}$, which is referenced to the visibility region, and/or to the complex hologram values, in order to modify the phase and/or the amplitude of the complex values of these data.

The principle of using look-up tables can preferably be extended. For example, parameter data for colour and/or brightness information from separate look-up tables can be used. In addition, the data sets $DP_{VR}$ or the data set $D\Sigma_{VR}$ can be modulated with brightness and/or colour values which are also retrieved from the look-up tables. For a colour representation, it is also possible that the colour related data sets $DP_{VR}$ can be retrieved from respective look-up tables of the primary colours.

The look-up tables are generated by determining for example for each possible object point in a defined space the corresponding entry of the data set $DP_{VR}$, which is referenced to the visibility region, by propagating the light waves of the object point through transformation into the visibility region. The entries are stored in a certain structure in suitable data carriers and/or storage modules, or they are provided through interfaces. Another solution is to determine the corresponding entry of the data set $DP_{VR}$, which is referenced to the visibility region, with the help of the ray tracing method. It is also possible to determine these data sets with the help of optimisation and/or approximation methods. The space comprises for example the intended range of motion of the observer—and of his eyes—in which he can see the hologram.

The method according to this invention accesses these data for all object points to be reconstructed. For example, the depth information of an object point is used to request, read and process the corresponding data set $D\Sigma_{VR}$. The same applies accordingly to colour and brightness related look-up tables and for look-up tables of further parameters. The read data can be processed further without any delay and without any complex computation to be carried out. The generation of the hologram values in real time can thus be substantiated by the inventive method.

The visibility region is composed of a grid in order to describe the propagation of the light waves of the object points to the visibility region with the help of a data set $DP_{VR}$. This region is structured for example with lines and columns similar to a matrix, where each matrix element represents a complex number. All elements together form the data set $DP_{VR}$. When having m lines and n columns, the data set $DP_{VR}$ comprises mtimes n complex numbers. The data set is structured such as to allow suitably fast access to the data values. Analogous principles apply to the data set $D\Sigma_{VR}$ of the entire scene.

Another general idea of the invention relates to the prevention of undesired side-effects of speckling. A speckle is a single spot of light which is perceived by the observer in the hologram. A speckle generally originates from randomly distributed extreme values of the intensities. According to the present invention, the values of the aggregated data set $D\Sigma_{VR}$, which is referenced to the visibility region, are smoothened. This means that for example the extreme values of the amplitudes are reduced. Further, any discontinuities in the amplitude curve and/or phase curve can be corrected. It is also possible to modify the entries in the data set $D\Sigma_{VR}$ with the help of optimisation methods and self-learning algorithms in order to reduce the probability of speckle occurring. The data of preceding images of the video sequence are preferably taken into account in these considerations. It is possible to reduce the number and the intensity of speckle with the help of such a homogenisation or correction. It is further possible to apply these principles also to the data sets $D\Sigma_{VR}$.

Summarising, it can be said that, assuming the resolution of a commercially available light modulator means, which already allows the hologram to be represented at high quality, the previously very high and costly demands made on the computing unit for the generation of the holographic information can be reduced substantially. The computational load can be reduced by orders of magnitude when using the look-up tables. The inventive method thus allows the process to be carried out using common PC systems. This ensures that for holographic applications the holograms are generated in an interactive manner and in real time. Finally, thanks to the reliable generation of the holograms in real time, it is ensured that the resulting undesired delay for tracking the observer pupils can be reduced. The generation of the holograms for a single observer is also ensured for simple computing units in real time. The inventive method also allows temporally or spatially separated holograms to be provided in real time so as to serve multiple observers.

Because the generation of the holograms requires only little computational load, the computation may for example not be carried out by the central processing unit CPU of a computer. According to an alternative solution, the holograms are generated using the components of the graphics card, where preferably a graphics central processing unit (GPU) and/or specially configured computing units are used. This also allows increased data transfer rates to be used preferably.

The invention sustainably contributes to a general applicability and acceptance of holographic display devices and is of great economic benefit.

BRIEF DESCRIPTION OF THE DRAWINGS

The present invention is described in more detail below with the help of an embodiment and with reference to the drawings, wherein.

DETAILED DESCRIPTION

Figure 1:
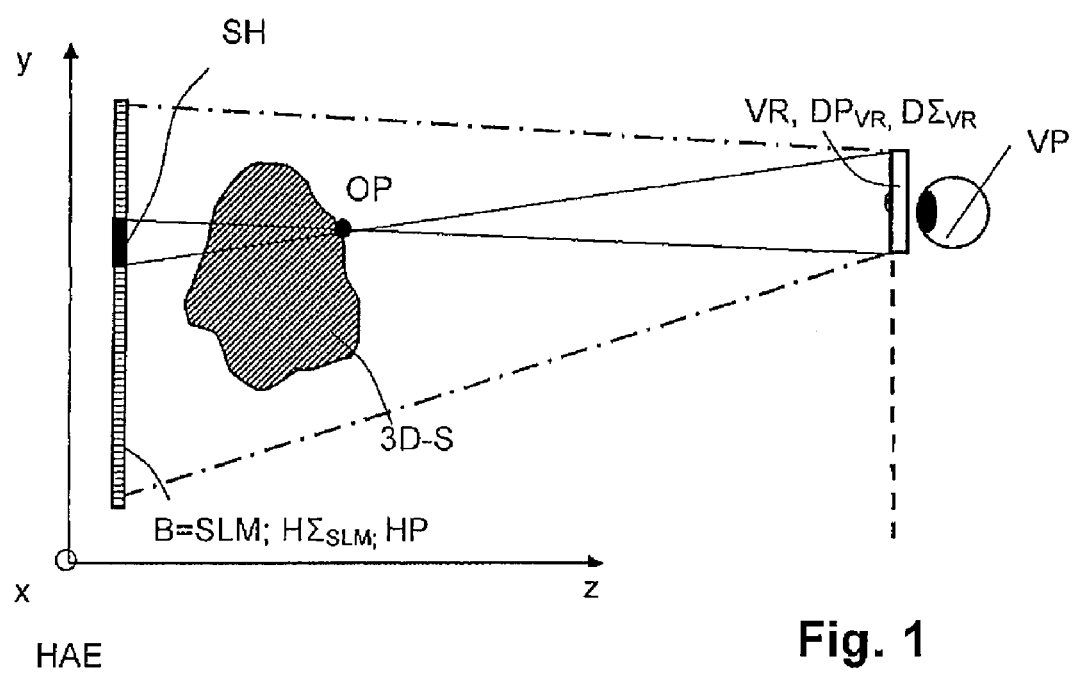
FIG. 1 illustrates schematically the principle of a holographic display device.

FIG. 1 illustrates the general principle on which a holographic display device (HAE) for one observer is based. The principle applies accordingly to multiple observers. The position of an observer is characterised by the position of his eye or his pupils (VP). The device comprises a light modulator means (SLM), which is identical to the screen means (B) in this embodiment in order to keep things simple; and it superimposes the wave fields which are modulated with information of object points of a scene (3D-S) in at least one visibility region (VR). The visibility region is tracked to the eyes. The reconstruction of a single object point (OP) of a scene (3D-S) only requires one sub-hologram (SH) as a subset of the total hologram ($H\Sigma_{SLM}$) encoded on light modulator means (SLM). As can be seen in this Figure, the region of the sub-hologram (SH) only comprises a small subsection of the light modulator means (SLM).

Figure 2:
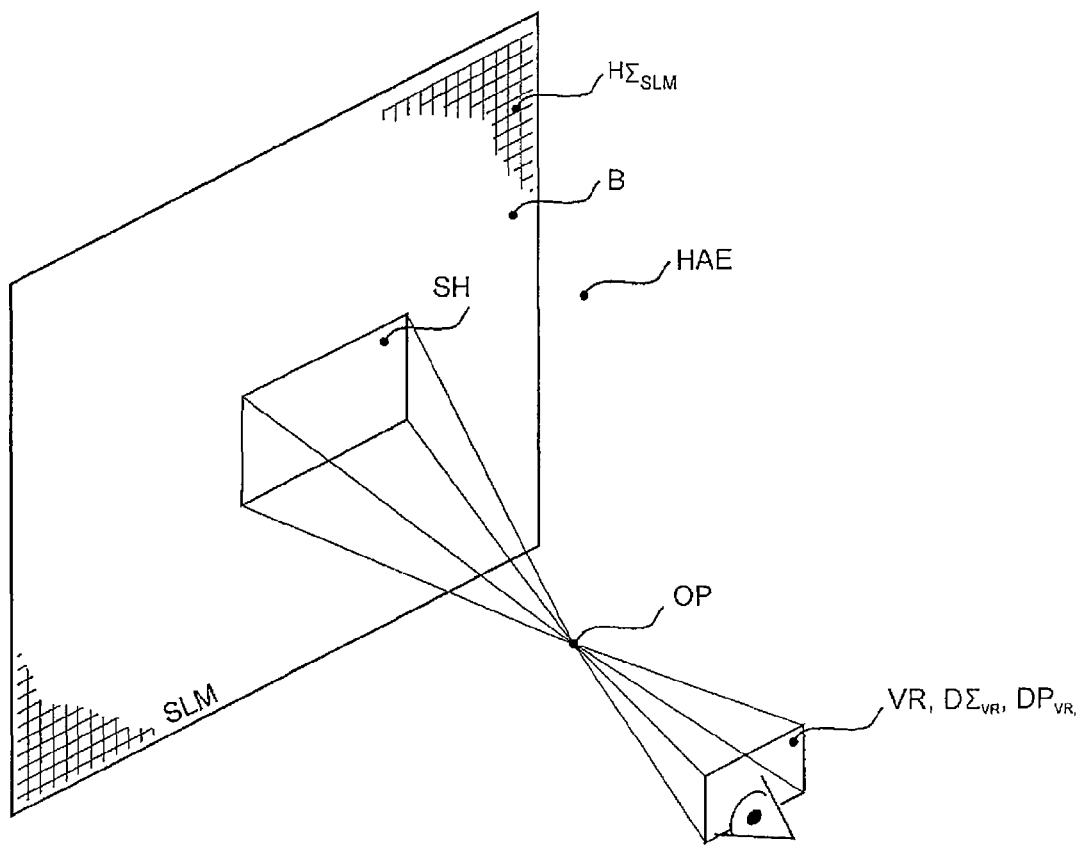
FIG. 2 is a three-dimensional view illustrating the principle of the holographic display device.

FIG. 2 is a three-dimensional representation which illustrates the principle of the holographic display device in more detail, where the same reference numerals are used.

Figure 3:
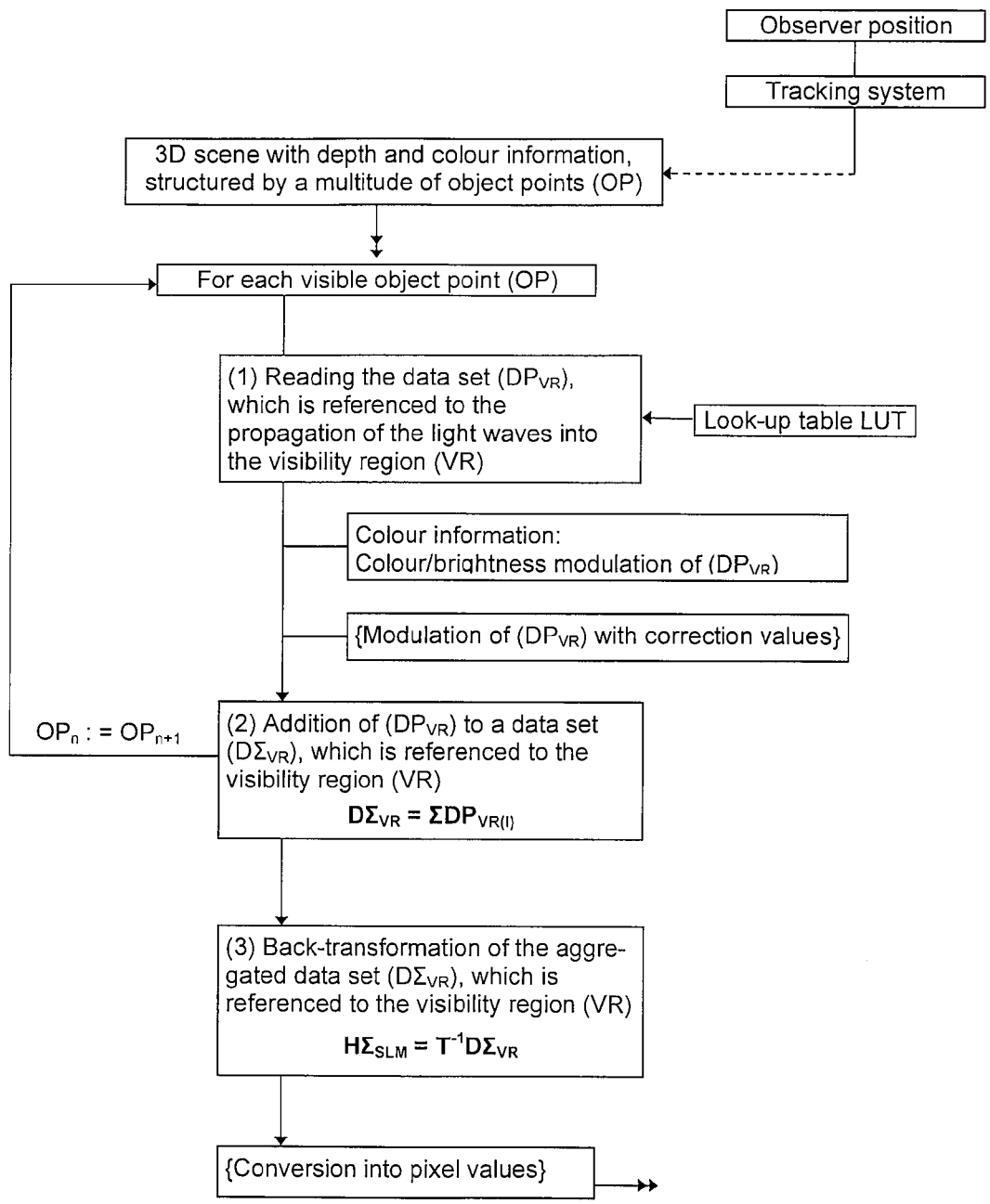
FIG. 3 shows a flowchart of the inventive method according to an embodiment.

FIG. 3 shows a flowchart of the inventive method according to an embodiment. This embodiment is based on a three-dimensional scene (3D-S) which is composed of a multitude of object points (OP). Colour and depth maps are available for the object points (OP). The depth map comprises the depth information and the colour map comprises the colour information of pixelated images, which are provided by a graphics system in this embodiment.

The following steps are carried out for each visible object point:

Step (1): Propagation of the light waves of the object point (OP) by transformation into the visibility region (VR) in order to obtain a data set ($DP_{VR}$) of the propagation, said data set being referenced to the visibility region (VR). According to the idea of the present invention, this data set ($DP_{VR}$) is retrieved from at least one look-up table. This data set is requested, read and processed using the depth information of the object point, here in a most simple embodiment using the normal distance of the object point to the centre of the visibility region. The light waves of the object point (OP) are not complicatedly transformed into the visibility region (VR), but instead the resulting values, i.e. the referenced data set ($DP_{VR}$), is requested and read from at least one look-up table.

Step (2): Repetition of the transformation until the entire scene (3D-S) is transformed with all their object points. For each object point, the data set ($D\Sigma_{VR}$) which is referenced to the visibility region (VR) is read from at least one look-up table according to step 1. These data are for example retrieved from dedicated memory sections of a graphics system or are taken over by interfaces, data carriers and storage modules.

In addition, the data sets $DP_{VR}$ can be modulated with brightness and/or colour values retrieved from look-up tables in order to modify the phase and/or the amplitude of the complex values of the data sets. For example, the complex values are multiplied with an intensity factor. The brightness and/or colour values are optionally retrieved from at least one look-up table. It is also possible to retrieve colour related data sets from look-up tables or to superimpose the corresponding tables of the primary colours.

Further, these data sets are added to a data set ($D\Sigma_{VR}$) which is referenced to the visibility region (VR).

This can be expressed with the help of the following equation:

$$D\Sigma_{VR} = \Sigma DP_{VRi}$$

The index i denotes a data set $DP_{VR}$ of an object point.

In this embodiment, the visibility region is structured similar to a matrix with m lines and n columns. This means that for a data set ($DP_{VR}$) m timesn corresponding complex values, i.e. the matrix elements, are read from the look-up table. In this embodiment, the data set ($D\Sigma_{VR}$) also has the same dimension.

Further, the side-effects of speckling are reduced by smoothening or modifying the values of the data set ($D\Sigma_{VR}$). The extreme values of the amplitudes are reduced, i.e. all amplitude values are limited. Further, any discontinuities in the amplitude curve and/or phase curve are corrected. According to a most simple embodiment, the value of a matrix element is compared to vertically and horizontally adjacent element values in order to find the discontinuities. The values are further modified by a self-learning algorithm such that the probability of the occurrence of speckles is reduced, said algorithm being implemented in the form of a neural network. The data sets of preceding images of the video sequence are also considered. The probability of speckles occurring or the actual frequency would be a suitable cost functional.

Step (3): Back-transformation, where the aggregated data set ($D\Sigma_{VR}$), which is retrieved in step 2 and which is referenced to the visibility region (VR), is transformed from the visibility region (VR) into a hologram plane (HP) in which the light modulator means (SLM) lies, so as to generate complex hologram values for the total hologram ($H\Sigma_{SLM}$), i.e. the video hologram.

This can be expressed with the help of the following equation:

$$H\Sigma_{SLM} = T^1 D\Sigma_{VR}$$

where $T^1$ is the inverse transformation operator.

The video hologram represents the hologram of all object points. The video hologram thus represents and reconstructs the entire scene.

In a final step (4) the hologram values can be encoded in Burckhardt components, two-phases components or any other suitable code in order to transform the total hologram into pixel values for the holographic display device; preferably using devices according to documents WO 2004/044659, WO 2006/027228, WO 2006119760 and DE 10 2006 004 300.

The invention claimed is:

1. Method for generating video holograms in real time for a holographic display device with at least one light modulator means on which a scene which is divided into object points is encoded as a complete hologram such that it can be seen as a reconstruction from a visibility region which lies within one periodicity interval of the reconstruction of the video hologram, where the reconstruction of a single object point only requires a subset of the complete hologram encoded on the light modulator means where the position and viewing direction of an observer define a view of the scene, and where the observer is assigned with at least one visibility region, which lies near the eyes, the method comprising the following steps:
   a) Propagation of the light waves from an object point by transformation into the visibility region in order to obtain a data set of the propagation, said data set being referenced to the visibility region,
   b) Repetition of the transformation until the entire scene is transformed for visible object points, wherein in order to describe an aggregated wave field of the entire scene for the visibility region the results of the individual transformations are added in a data set, the data set being referenced to the visibility region,
   c) Back-transformation of the referenced, aggregated data set into complex hologram values video holograms by transformation, where the just determined aggregated data set, which is referenced to the visibility region, is transformed from the visibility region into the hologram plane in which the light modulator means is positioned,
   wherein for each object point the data set, which is referenced to the propagation of the light waves into the visibility region, can be retrieved from at least one look-up table.

2. Method according to claim 1, where for each object point the data set, which is referenced to the propagation of the light waves into the visibility region, is modulated with at least one of brightness or colour values.

3. Method according to claim 2, where at least one of brightness or colour values are retrieved from at least one look-up table.

4. Method according to claim 1, where corrective values are modulated to at least one of the data sets, which are referenced to the propagation of the light waves into the visibility region, and the aggregated data set, which is referenced to the visibility region, and/or to the complex hologram values.

5. Method according to claim 1, where the values of the aggregated data set, which is referenced to the visibility region, are smoothened.

6. Method according to claim 5, where the extreme values of the amplitudes are limited.

7. Method according to claim 5, where discontinuities in the amplitude and/or phase curves are homogenised.

8. Method according to claim 1, where the probability of the occurrence of undesired speckle in the video hologram is reduced with the help of optimisation methods or self-learning algorithms being applied on the entries in the data set.

9. Method according to claim 1, where the complex hologram values are converted into pixel values of the light modulator means.

10. Method according to claim 9, where the complex hologram values are converted into Burckhardt components or two-phase components or any other suitable code.

11. Method according to claim 1, where the look-up table is generated by determining for each possible object point in a defined space the corresponding entry of the data set, which is referenced to the visibility region, by propagating the light waves of the object point through transformation into the visibility region.

12. Method according to claim 1, where the look-up table is generated by determining for each possible object point in a defined space the corresponding entry of the data set, which is referenced to the visibility region, with the help of the ray tracing method.

13. Method according to claim 1, where the look-up table is generated by determining for each possible object point in a defined space the corresponding entry of the data set, which is referenced to the visibility region, with the help of optimising or approximation methods.

14. Method according to claim 1 for a holographic display device with a screen means, where the screen means comprises either the light modulator means itself on which the hologram of the scene is encoded, or an optical element on to which a hologram or wave front of the scene encoded on the light modulator means is projected.

15. Method according to claim 14, where the optical element of the display device comprises a lens or mirror.

* * * * *